May 25, 1965

H. G. SPERLING 3,185,893

CONTROL APPARATUS FOR RESTORATION OF BRIGHTNESS
IN ELECTROLUMINESCENT CELLS

Filed Dec. 30, 1960

INVENTOR.
HERMAN G. SPERLING
BY
Charles J. Ungemach
ATTORNEY 3,185,893
CONTROL APPARATUS FOR RESTORATION OF BRIGHTNESS IN ELECTROLUMINESCENT CELLS
Herman G. Sperling, St. Louis Park, Minn., assignor to Honeywell Inc., a corporation of Delaware
Filed Dec. 30, 1960, Ser. No. 79,834
5 Claims. (Cl. 315—246)

This invention involves control apparatus and more particularly apparatus for use with electroluminescent lamps to increase their brightness and chromatic contrast by increasing saturation, without serious harm to the lamp.

In recent years a large amount of research and development has been centered about lamps employing the electroluminescent principle. The use of such lamps has been investigated for area lighting and instrument illumination, for example, but several disadvantages have become apparent. One serious disadvantage which arises when the lamps are to be used to illuminate instruments is their lack of brightness. Most presently available lamps are unable to produce sufficient brightness to make an instrument panel clearly visible in a normally lighted office room.

It is known, however, that increasing the voltage on an electroluminescent lamp increases the lamp luminance and that increasing the frequency increases the luminance and changes the wave-length of emitted light to provide more saturation and thus greater chromatic contrast. Hence by increasing the voltage and frequency applied to an electroluminescent lamp, its brightness may be made sufficient for use in illuminated areas. It has been found, however, that the electroluminescent lamps which are commercially available have certain sinusoidal voltage and frequency maximums beyond which the lamp life is shortened by decay. This decay at increased voltage and frequency may occur either because of excessive heat generated which sets fire to the protective coating or because of piercing of the dielectric in the lamp. Using values of voltage and frequency below that at which decay is excessive causes the brightness of the lamps to fall short of that necessary to meet the requirements for display in illuminated areas.

According to the teachings of the present invention, increased brightness without decreased life is provided by energizing the lamp from a pulsating D.C. source of short duty cycle. Preferably square wave pulses are made to occur for rather short durations during successive cycles so that voltages are applied to the lamp for only a small time, in the neighborhood of 10%, of each cycle. By so energizing an electroluminescent lamp, it has been found that the frequency can be increased far beyond the maximum sinusoidal values thereby improving brightness and chromatic contrast without seriously changing the life of the lamp.

A more complete understanding of the present invention will be obtained upon the examination of the following specification and claims together with the drawings in which:

Figure 1:
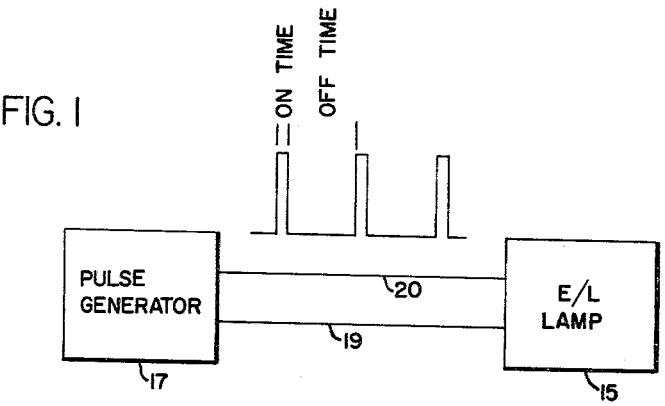
FIGURE 1 is a simplified block diagram of the present invention.

Referring now to FIGURE 1, an electroluminescent lamp 15 is shown connected to a pulse generator 17 by a pair of conductors 19 and 20. Pulse generator 17 operates to supply the electroluminescent lamp 15 with energy in the manner shown in FIGURE 1, that is, with short duration pulses. As shown in FIGURE 1, the time during which the pulse generator supplies voltage to the lamp in a given cycle is about 10% of the cycle, while the generator is supplying no voltage during about 90% of the cycle. While in the preferred embodiment, I use a duty cycle of about 10%, it has been found that duty cycles somewhat greater or less than 10% can be used to advantage. For example, it has been found that duty cycles of 20% and 25% allow an increase of brightness, but with somewhat greater effect on the life of the lamp. Likewise duty cycles of 5% are effective but are more difficult to obtain. Duty cycles above 30% begin to cause excessive decay of the lamp when the higher voltages and frequencies are employed, and hence, it is recommended that to obtain the best brightness and life, duty cycles of less than 30% should be used. In the preferred embodiment, a 10% duty cycle has been employed which gives significantly greater brightness at the elevated voltages and frequencies without serious harm to the life of the lamp.

As previously stated, increasing the voltage applied to an electro-luminescent lamp increases its brightness, and increasing the frequency provides additional increase in brightness as well as greater sharpness of color. Because a square wave has inherently greater frequency components, and because of the short duty cycle employed in the present invention, greater luminance is obtained even at the same pulse frequencies and voltages. Likewise because of the short duty cycle, the frequency can be increased many times beyond that where serious decay results from sinusoidal energization. Consequently the overall operation of the lamp produces even further increased brightness and sharpness of color (saturation).

Figure 2:
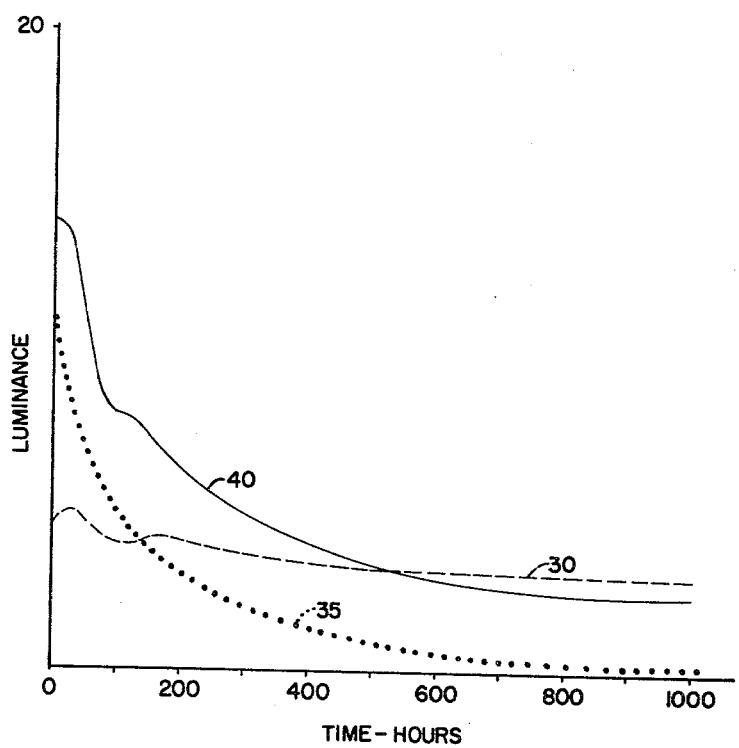
FIGURE 2 is a graph comparing the relative brightness and life of a lamp both with and without the teachings of the present invention.

FIGURE 2 is a graph comparing brightness and life of a typical electroluminescent lamp (1) excited sinusoidally at a normal frequency, (2) excited sinusoidally at an elevated frequency, and (3) excited according to the present invention with short duration pulses of the same elevated frequency. The lower curve shown by dashed line 30 represents a Sylvania blue-green electroluminescent lamp excited sinusoidally at 950 volts peak-to-peak and at a frequency of 400 cycles per second. It is seen from this curve that the brightness does not change much over an 800 hour period of operation, but is small compared to the initial brightness of the other curves.

Curve 35, shown as a dotted line, represents the same lamp excited sinusoidally with the same 950 volts peak-to-peak, but with the frequency increased to 3,700 cycles per second. It is seen from curve 35 that the brightness is about doubled during the first few hours of operation, but that by about 100 hours the intensity is fallen off to below that of the lamp of curve 30 and that curve 35 quickly degenerates into an area of nearly complete uselessness.

Curve 40 represents the same lamp when excited with the square wave pulsating D.C. of the present invention. The voltage applied to the electroluminescent lamp was again 950 volts and the frequency was again 3,700 cycles per second but a square wave pulse with a duty cycle of 10% was employed. It is seen from curve 40 that the brightness is increased greatly over that of curve 30 at first and continues to be greater up through about 500 hours of operation. It is also noticed that the brightness is about 30% greater than that of curve 35 at first and is many times brighter than curve 35 after several hundred hours of operation. Furthermore, the brightness falls off only slightly lower than that of curve 30 after 500 hours. It is thus seen that by using pulsating techniques of the present invention, the brightness of an electroluminescent lamp can be greatly increased while its life is extended beyond that attainable at increased frequency under sinusoidal operation.

It has also been found that by using the pulsating techniques, whereby increased frequency is possible, more conspicuous colors are attained. For example, at a frequency of 3,700 cycles, a blue-green lamp appears as a highly saturated blue which yields a visual brightness over twice that of the measured luminance. A blue lamp on 3,700 cycles yields an intense violet with an even greater visual brightness advantage. Yellow and orange lamps do not shift color from low to high frequency, but by placing a Wratten #25 filter over a Westinghouse orange lamp powered at 3,700 cycles and 950 volts, an intense scarlet-red is obtained which is quite visible under 60 foot-candles incident luminance.

Finally it has been found that the original brightness may be regained after a period of operation by increasing the magnitude of the pulsating voltage. For example, the lamp of curve 40 was subjected to 1,900 volts after 1,000 hours of operation and the original brightness returned. This voltage is about twice that originally applied to the lamp and would have been totally destructive to the lamp originally. It is seen then that the life of the lamp can be greatly extended under the teachings of the present invention by increasing the applied voltage as the lamp ages. In fact it is possible to maintain an even brightness by steadily increasing the applied voltage as the lamp ages under use. To provide an increased voltage with the apparatus of FIGURE 1, any conventional means may be employed such as changing the input drive signal to the pulse generator 17 or by using a variable transformer either manually or automatically driven at the output of the pulse generator 17.

Various alternatives will occur to those skilled in the art, for example, instead of using square wave pulses, saw toothed or other shaped pulses might be employed. I, therefore, do not wish to be limited to the specific disclosures employed with the preferred embodiment but intend only to be limited by the following claims.

I claim:

1. Apparatus of the class described comprising, in combination: an electroluminescent lamp having a normally considered sinusoidal voltage frequency maximum; a pulsating voltage source wherein the pulses occur during less than 30% of the operating time, said pulsating voltage source producing pulses at a frequency in excess of the normally considered maximum, the voltage source providing an output voltage which changes in amplitude as a function of time to keep the luminescence of said lamp within predetermined limits; and means connecting said electroluminescent lamp to be energized by said pulsating D.C. voltage source.

2. In combination: an electroluminescent lamp; and means for energizing said lamp with pulses of electrical energy having a duty cycle of less than 30%, the amplitude of said pulses increasing as a function of time of energization of said lamp to provide nearly constant luminescence throughout the useful life of said lamp.

3. Apparatus of the class described comprising in combination: an electroluminescent lamp which when energized by a source of voltage of predetermined magnitude will be destroyed; voltage generator means having a range of output voltage above and below the predetermined magnitude; means connecting said lamp for initial energization by said voltage generator means at a voltage below the predetermined magnitude; and means increasing the voltage from said voltage generator means to a value above said predetermined magnitude after a predetermined period of operation.

4. The method of increasing the brightness and life of an electroluminescent lamp comprising the steps of: energizing the lamp with pulses of electrical energy having a duty cycle of less than 30%; and as the lamp ages under use, increasing the magnitude of the applied pulses to beyond that which would have destroyed the lamp originally.

5. The method of increasing the useful life of an electroluminescent lamp comprising the step of increasing the applied voltage after a predetermined period of operation to a value which would have destroyed the lamp at initial energization.

References Cited by the Examiner

FOREIGN PATENTS 556,066    4/58    Canada.

OTHER REFERENCES

"Aging of Electroluminescent Phosphors," by S. Roberts, pages 262 to 265, Journal of Applied Physics, vol. 28, No. 2, February 1957.

GEORGE N. WESTBY, *Primary Examiner.*

RALPH G. NILSON, *Examiner.*